E. L. BARRY.
NUT LOCK.
APPLICATION FILED JULY 1, 1911.

1,010,343. Patented Nov. 28, 1911.

Witnesses:
Edith C. Tate
J. T. Walker.

Inventor:
Edwyn L. Barry.
By
Attorney.

UNITED STATES PATENT OFFICE.

EDWYN LAKE BARRY, OF FULHAM, LONDON, ENGLAND.

NUT-LOCK.

1,010,343.  Specification of Letters Patent.  Patented Nov. 28, 1911.

Application filed July 1, 1911. Serial No. 636,333.

*To all whom it may concern:*

Be it known that I, EDWYN LAKE BARRY, a subject of His Majesty the King of England, residing at 357 North End road, Fulham, in the county of London, Kingdom of England, have invented a certain new and useful Improved Nut-Lock, of which the following is a specification.

This invention relates to improvements in nut locks of the class in which a screw threaded split bush on the bolt, having a conical outer surface, engages a conical recess in the base of a nut and is contracted thereby to grip the bolt as the nut is screwed up.

My invention consists in forming the split bush and recess in the nut with curved surfaces and in other improvements hereinafter described.

One object of my invention, is to construct a nut lock consisting of two parts or elements in which that part which bears on the work shall be locked upon the bolt by the other portion in such a manner, that it is held stationary in that position, and is thus unaffected by any turning movement, on the part of the bolt, or of the work held between the head of the bolt, and the nut lock, which movement causes a nut to slacken back in ordinary use.

Another object is that the nut lock shall occupy within a fraction, the space of an ordinary nut, and shall be locked by the pressure of a spanner, applied in the ordinary way, and similarly released.

Figure 1:
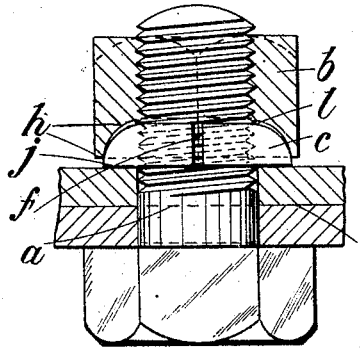
Figure 2:
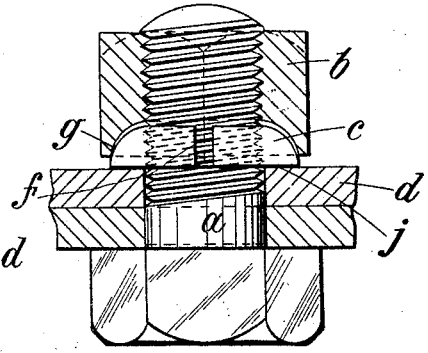
Figure 3:
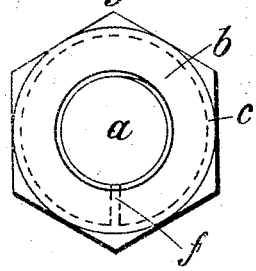
Figure 4:
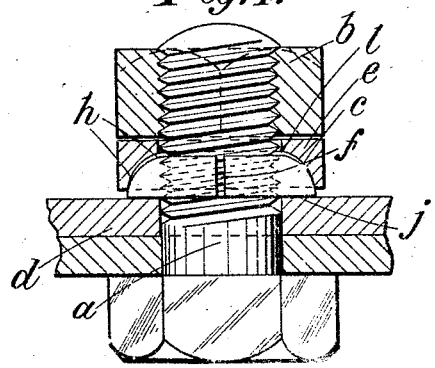
Figure 5:
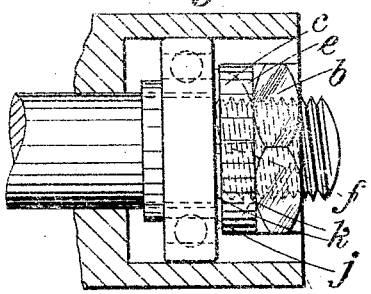
Figure 6:
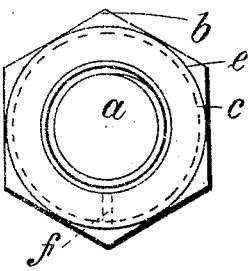

Figure 1 is a sectional elevation of the improved nut lock; Fig. 2 is a similar view showing the parts before tightening the nut; Fig. 3 is a plan view; Fig. 4 shows in sectional elevation a slightly modified arrangement. Fig. 5 shows the invention applied to an axle or shaft fitted with ball bearings; and Fig. 6 is a plan view thereof.

As shown in the accompanying drawings the collar $c$ is internally threaded, radially coned and also slotted in one place as shown in Figs. 1, 2, 4 and 5. The slot is slightly opened, as shown at $f$ Fig. 2, so as to be a slack fit upon bolt $a$. The collar $c$ is approximately one third the height of the nut $b$. It is necessary to make the collar $c$ in right proportions to the recessed nut $b$, for if the collar $c$ is made too large, the nut would be weakened and the lock would be ineffective, on the other hand if the collar $c$ is made too slight, it would be crushed, and would not resume its original position when released.

The collar $c$ being in one unit and slotted in one place, is capable of being compressed and will resume its original position, when released, as shown in Fig. 2 at $f$. The collar $c$ is internally screwed, so as to engage a portion of the threaded bolt $a$, as shown.

The internally threaded portion of the collar $c$, and the externally threaded portion of the bolt $a$, shown in Fig. 1 at $k$, is the area of lock. The collar $c$ is radially coned as shown and the base of the same is brought as near the flats of the nut $b$ as possible, as shown in Figs. 1 and 2, so as to give the utmost possible strength to the collar $c$ in the above stated space. Also the shape of the cone of collar $c$ being radial, greater latitude of lock is obtained, as shown at $h$, Figs. 1 and 4, than if the cone was straight. The top of the coned collar $c$ is left flat, thus a space $l$ is left between its top and the top or recessed portion of nut $b$, when the said nut is screwed down, and fully locked, this being shown at $l$ Figs. 1, 2 and 4 for the reason, if this coned part of the collar $c$ came into contact with the recessed nut $b$ at this point, and there occurred any movement of the said collar $c$ through reasons stated above, the recessed nut would slacken back. But as the space $l$ Fig. 1, is provided, should the collar $c$ move, it will be more firmly pressed upon the threaded portion of the bolt $a$ it engages, and at the same time it will force the recessed nut $b$ against the threaded portion of the bolt $a$, which it engages instead of slackening the same.

The nut $b$, Figs. 1 and 2 is radially recessed at the bottom, and is made, so that it engages the collar $c$, as low down as possible as at $g$, Fig. 2, without coming into contact with the work $d$, Figs. 1 and 2, when fully locked. The shape of the recessed portion of nut $b$ is such, that when the recessed nut $b$ has fully locked the collar $c$ upon the work $d$, that it has full surface contact, as at $j$ in the drawings.

The collar $c$ Figs. 1, 2, 4 and 5 is first screwed down the bolt $a$, upon the plates or work $d$. The recessed nut is then screwed on coming into contact with the collar $c$ at $g$, Fig. 2; the cone of the collar $c$ and the recessed portion of nut being so shaped that the whole pressure of the descending nut $b$ is diverted horizontally toward the center of bolt $a$, through the collar $c$ which is circumferentially locked, upon the portion of the threaded bolt $a$ it engages, as shown at $k$ Figs. 1 and 5. No lock thus occurs before the collar $c$ bases on the work $d$. The nut $b$ holds the collar $c$ as shown in Figs. 1, 4, and 5 in this position, and thus prevents the collar $c$ slackening back, until the nut $b$ is released.

The recessed portion of the nut $b$ can be made separate from the nut $b$ as shown at $e$ Figs. 4 and 5, and can be used in conjunction with an ordinary nut $b$, Fig. 4 or with a check nut $b$ as shown in Fig. 5. This lock can be applied to locking ball bearings on axles as also shown in Fig. 5.

What I claim as my invention and desire to secure by Letters Patent of the United States is:—

1. The combination of a bolt, a split collar having screw-threaded engagement with said bolt and provided with a curved outer surface, and a nut adapted to screw on said bolt and provided with a recess for the reception of said split collar so that the split collar may be compressed circumferentially on the bolt to lock the collar to the bolt, the nut in locked position shielding substantially all of the collar in its recess.

2. The combination of a bolt, a split collar having screw-threaded engagement with said bolt and provided on its outer surface with a curved portion and also a flat portion, and a nut adapted to screw on the bolt and provided with a recess to receive substantially all of said collar and adapted to act upon the curved portion of the outer surface of the collar to compress the same circumferentially toward the bolt and thereby lock the collar to the bolt, the flat portion of the outer side of the collar being adapted to provide a recess between the outer side of the collar and the bottom of the recess of the nut so that upon any movement of the collar the nut will effect a firm locking of the collar on the bolt.

In testimony whereof I have hereunto set my hand in presence of two subscribing witnesses this twenty-first day of June 1911.

EDWYN LAKE BARRY.

Witnesses:
J. S. WITHERS,
L. BLAKEY.